Aug. 22, 1939.  G. A. TINNERMAN  2,170,739
JOINT OR CONNECTION
Filed April 29, 1938
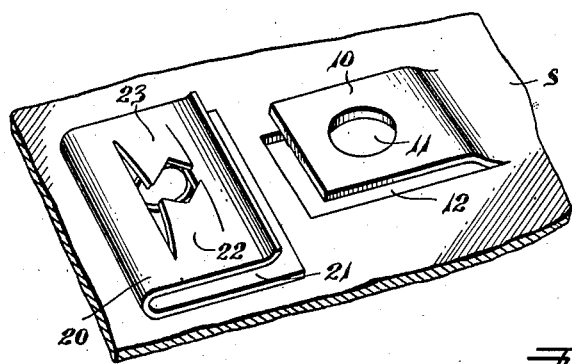
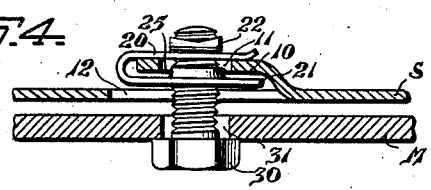
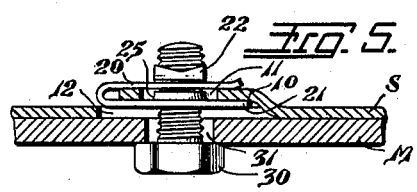
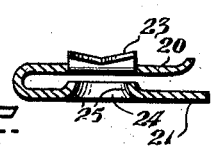
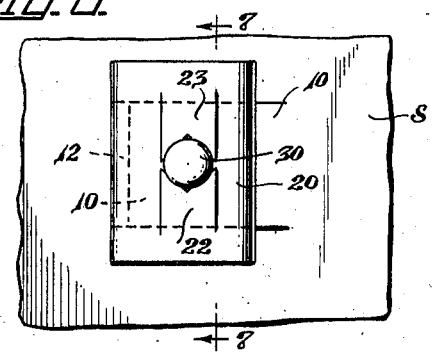
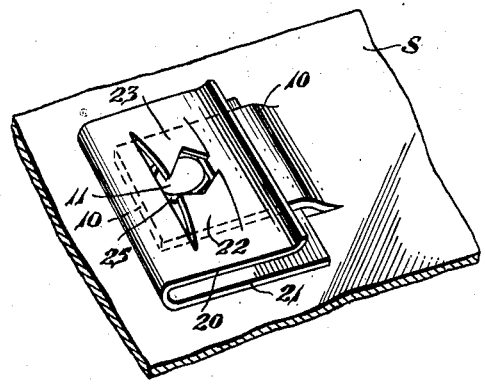
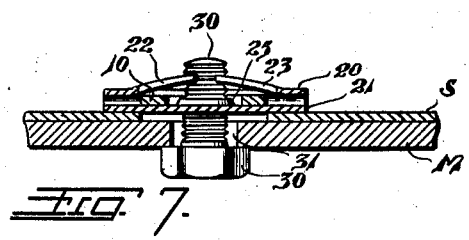
Inventor
GEORGE A. TINNERMAN
By H. S. Lombard
Attorney Patented Aug. 22, 1939

2,170,739

UNITED STATES PATENT OFFICE 2,170,739

JOINT OR CONNECTION

George A. Tinnerman, Rocky River, Ohio, assignor to Albert H. Tinnerman, Cleveland, Ohio Application April 29, 1938, Serial No. 205,090

12 Claims. (Cl. 189—36)

This invention relates to an improved joint or connection embodied in a structural unit for a metallic structure in which the respective parts are not conveniently or readily accessible from both sides in the assembled relation thereof wherefore it becomes necessary to employ some extraneous means for retaining the securing means of the connection in applied position in an assembly preparatory to the operation for completing the fabrication of the structure. Constructions of this character requiring a joint or connection of the type exemplified by the instant invention have a wide range and variety of uses in the manufacture of articles comprising the panels and other precisely fitted parts of stoves, ranges, utility cabinets, metal furniture, refrigerator cabinets, casings and structural details of automobile body constructions and the like.

Examples of such constructions are disclosed in applicant's Patent 2,103,833, issued December 28, 1937, and copending prior application Serial No. 143,786 filed May 20, 1937, which has since been issued as Patent Number 2,157,641, May 9, 1939.

In the fabrication of sheet metal structures, it is well known that the attachment of ordinary sheet metal parts by means of screws threaded in openings provided therein is generally inefficient and unsatisfactory in that the walls of the openings thus provided are of insufficient thickness to form suitable threads with which a bolt or screw fastening may threadedly engage and be retained effectively in applied position. Also, it is usually impractical to tighten a threaded member in such an opening since the bolt engaging elements thereof are easily stripped and mutilated by the axial drawing action incident to tightening, thereby causing the opening to become enlarged to the extent that the threaded member is loose in its final applied position and subject to unscrewing and displacement.

Accordingly, conventional threaded nuts have been found necessary for securing the various parts of sheet metal structures, such nuts being known in the trade, generally, as clinch-on nuts and are riveted, spot-welded, or otherwise secured to a sheet metal part by a suitable cage device preparatory to the assembly thereof in a structure in which it is readily accessible from one side only; that is, in a blind location wherein it is impossible or inconvenient for an operator to hold the nut while inserting the securing bolt or screw thereto. However, any such arrangement comprising only a threaded nut is often unsatisfactory and inefficient over a period of use because, generally, no means are provided to prevent loosening and unscrewing of the threaded fastener. Furthermore, though any such fastening arrangement may be employed somewhat satisfactorily in certain installations in which cost is of no great consequence, the use thereof is prohibitive in such constructions as require a simple, light weight and inexpensive fastening means which may be easily and quickly applied in an installation in a minimum of time and effort in assembling operations.

In view of the foregoing, it will be understood that a most practical arrangement for securing such sheet metal parts involves the use of tempered, spring metal locking plates having integral bolt receiving means struck and formed therefrom designed for threadedly engaging a threaded fastening member in the manner of a nut. The spring metal material of such locking plate is, of course, considerably harder than that of the sheet metal supporting structure and accordingly, the bolt engaging elements thereof are admirably suited for providing not only a stronger, superior connection between the part secured and the supporting structure than would be possible otherwise, but also a tightened, practically self-locking, fastening engagement of the securing bolt, in final applied position rigidly securing the respective parts of an installation. Thus, there is eliminated the necessity for lock washers and the like, with the resultant savings in the cost of such devices and the expense involved for labor in the tedious, time-consuming assembling operations which they require.

In the use of such spring locking plates, one of the most difficult problems which must be overcome is the provision of a suitable, satisfactory and inexpensive arrangement for retaining the locking plate on a sheet metal part preparatory to the application of a bolt fastening thereto in the fabrication of a structure. And to this end, various types of such locking plates embodying retaining arms, ears, lugs and similar holding elements are effectively employed. In applicant's Patent 2,103,833, aforesaid, there is shown such an arrangement embodying a substantial U-shaped, clip type of locking plate comprising a pair of arms embracing the supporting part on either side thereof to retain the locking plate in applied position thereon preparatory to the application of the bolt fastening for securing a part thereto. Thus, the retaining arm of the clip is disposed in projecting relation to the forward side of the supporting part in which relation it is impossible to secure a part thereto in close, flush engagement therewith as is necessary in many installations requiring evenly disposed, precisely fitted parts.

The present invention therefore has for a primary object, the provision of a joint or connection in which a clip type locking plate and the retaining means therefor are disposed entirely to the reverse side of the supporting member thereby enabling the attachment of a part to the forward side thereof in close, flush engagement therewith.

Another principal object is to provide a connection or joint embodying a clip type locking plate and comprising a retaining means struck and integrally formed from the supporting part to project entirely to one side thereof to serve as a substantial lug element which may be engaged by the arms of the locking plate for holding the same in applied position preparatory to the application of a bolt fastening thereto.

A further object is to provide in such a joint or connection a retaining means comprising an apertured lug element integrally provided from the supporting member and adapted to hold the locking plate in applied position thereon with the aperture therein serving as a bolt passage for the fastening applied thereto in securing a part to the supporting member.

A more specific object contemplates the provision of a joint or connection of the class described comprising an integral, apertured lug retaining means for a clip type locking plate having a substantial floating mounting thereon and otherwise capable of limited adjustment in applied position in the final assembly of the parts of an installation.

Further objects of the invention, and other new and useful features in the construction, arrangement and general combination of parts, will be readily apparent to those skilled in the art as a description thereof proceeds with reference to the accompanying drawing in which like reference characters designate like parts throughout the same, and in which:

Fig. 1 is a fragmentary perspective view of a sheet metal part provided with a lug element struck and formed therefrom for retaining a clip type locking plate shown about to be applied thereto;

Fig. 2 is a cross-section of a clip type locking plate illustrated in Fig. 1;

Fig. 3 is a fragmentary perspective similar to Fig. 1 showing the locking plate as applied to the retaining lug element;

Fig. 4 is a fragmentary sectional view showing the improved connection as embodied in a sheet metal supporting part of an installation preparatory to the tightening of a bolt fastening for securing a member thereto;

Fig. 5 is a similar view of the installation as completed, showing the member secured in close, flush engagement with the supporting part;

Fig. 6 is a top plan view of Fig. 5; and,

Fig. 7 is a section of Fig. 6 taken along line 7—7, looking in the direction of the arrows.

It is often desirable in bolting parts together, particularly in inaccessible locations or other positions accesible only with difficulty, to provide some manner of holding the nut element in its desired position while the bolt is being applied thereto. Furthermore, it is often difficult, especially in the final assembly of parts, to bring the respective bolt passages provided therein into proper alignment for the insertion of the bolt fastening. It is therefore frequently necessary that some adjusting means be provided in one or both of the members secured in order that the respective bolt passages may be suitably aligned for receiving the bolt fastening. Otherwise, it often becomes necessary to provide a new, accurately positioned hole to receive the bolt fastening and in the assembly of all metal structures, it is most inconvenient, laborious, time-consuming and usually impractical, to compensate for an improperly positioned hole by drilling a new hole. To overcome this, it has been found expedient to make the bolt passages in the supporting member of extra large size such that the bolt fastening is freely movable therein and may be adjusted as necessary to properly engage with the nut element provided on the supporting member. However, due to the fact that the nuts with which the bolts co-engage are often located in inaccessible locations and frequently require a certain amount of adjustment in order to correspond with the applied position of the bolts, it is necessary to retain the nuts on a support in what may be termed a floating mounting. And heretofore such mountings have been provided by the use of special nut holding means such as sheet metal cage devices and the like which are spot-welded, riveted or otherwise secured onto the inner face of the supporting member. In any event, the use of such cage or nut holding devices is objectionable due to the added costs involved and also the expensive, time-consuming manufacturing operations required in spot-welding or riveting the assembled nut and cage onto the supporting member.

The instant invention, in providing a joint or connection in which the locking plate is adjustably retained by integral means provided from the sheet metal part, is highly advantageous in that the use of conventional threaded nuts and separate nut holding or cage devices is entirely dispensed with; likewise, the expensive, time-consuming operation of spot-welding or riveting the nut holding devices onto the sheet metal part is eliminated with the resultant savings in the expense of such apparatus and other costs of manufacture. And, at the same time, a connection is provided which not only is substantially equal in strength and appearance to any heretofore known similar assembly of parts, but also, in which the bolt fastening is rigidly secured by the bolt engaging elements of the locking plate under continuously effective spring holding action to provide a substantially locked connection in which the connected parts in a completed structure are not subject to loosening or displacement incident to strain and vibration over long periods of use.

Referring now, more particularly, to the drawing, the letter S, designates generally a sheet metal part which may be a fragment of any sheet metal structure to which it is desired to attach another part or member by means of a bolt or screw fastening employing the improved connecting means of the present invention. Generally, it is preferable that the supporting part be provided with means adapted for receiving the locking plate and retaining the same entirely to the reverse side thereof wherefore a member secured thereto may be brought into close, flush engagement therewith in a completed installation such as shown in Fig. 5. This, of course, is a highly advantageous arrangement which is particularly useful in installations comprising closely fitted, precisely assembled parts in providing a uniform, smooth, exterior appearance.

As best seen in Fig. 1, in order to adapt the sheet metal part S for use with a clip type locking plate in providing the improved connection of the present invention, an integral lug member 10, provided with a bolt passage 11, is struck and formed therefrom to project entirely to one side thereof, thereby presenting a substantial tongue to which a clip type locking plate may be fitted and retained in applied position preparatory to the application of a bolt fastening thereto. Inasmuch as such a retaining element 10 is simply a lug element struck and formed from the supporting part to project out of the plane thereof, it will be appreciated that the same may be provided with little added expense over and above that which would be required for providing the necessary bolt passage in any event.

The locking plate shown in connection with the present invention is preferably constructed from a small section of tempered spring metal, which, of course, is considerably harder and possessed of much greater tensile and compressive strength than the material of the sheet metal part to which it is attached; it is quite obvious however, that an effective locking plate may also be provided from any other suitable material such as cold rolled metal, or the like, this being merely a matter of choice. In forming a clip type locking plate a strip of sheet metal material is bent back upon itself to provide a pair of arms one of which is indicated at 20 and the other at 21. These arms may be substantially equal in width but at least one is of a length greater than the width of the slot 12 from which the retaining lug element 10 is struck and formed, wherefore such arm will bridge the slot and prevent the fastener from being pulled through the support on tightening of the bolt fastening in completing an installation as presently to be described.

The arm 20 is provided with integral bolt receiving means 22, 23 deformed, extruded, or otherwise struck and formed to project out of the plane thereof for threadedly engaging the shank of a bolt, screw or other fastener in the manner of a nut, while the arm 21 is provided with an aperture 24 in registration therewith through which the shank of a bolt or other fastening may extend for threadedly engaging said bolt receiving means in a completed installation. The said bolt engaging means comprising opposed cooperating tongues 22, 23 are preferably struck and formed from the arm 20 of the locking plate to extend upwardly therefrom in substantial ogee formation with the extremities thereof so spaced as to lie on a helix corresponding substantially to the pitch of the threads on the bolt fastening for most effective, uniform threaded engagement therewith. Such integral bolt receiving means in the locking plate, of course, may be provided in any other suitable form or construction depending on the strength required and the use to which the locking plate is put, so long as the elements thereof threadedly engage with the bolts as they are driven home. However, it has been found that such bolt receiving means prepared in the form of cooperating tongues, as shown, are the most efficient and most practical in that they are possessed of unusual inherent strength and will not collapse or pull through on tightening of the bolt nor loosen from fastening engagement under constant strain, heavy usage and rough handling of an installation in which they are used. This is possible by reason of the fact that such tongues tend, more effectively, to move toward each other and dig into the grooves intermediate adjacent threads on tightening of the bolt or screw and thereby become embedded in the root diameter of such threaded member in locked, frictional fastening engagement therewith. Thus, any vibration, jarring or strain taking place in a completed mounting cannot cause displacement, reverse rotation or tend toward unscrewing of the threaded fastening member from applied fastening position. It will therefore be appreciated that in the provision of such integral bolt receiving means in the locking plate embodied in the joint or connection of the instant invention, the use of individual threaded nuts or lock washers of any kind is entirely dispensed with thereby making for a considerable saving not only in the cost of such nuts and lock washers, but also materially reducing the expense and labor involved in the tedious time-consuming assembling operations which such fastenings require.

The present invention also contemplates the provision of a joint or connection comprising a clip type of locking plate provided with means for automatically centering the same in suitable registration with the bolt passage in a sheet metal part and to be locked automatically to such part in bolt receiving position thereon. Preferably, such means are provided by deforming from the arm 21 an area adjacent the bolt passage 24 to provide a substantial indexing element 25 designed to fit into the bolt passage 11 of the retaining element 10 to which the locking plate is applied substantially as shown in Fig. 4. This construction thereby provides in effect an indexing means in the form of a substantial frusto-conical shape, the apex end of which extends above the plane of the arm 21 and in the same general direction as the bolt engaging elements 22, 23. It is obvious however, that such an indexing means may be provided in any other expedient manner and may comprise simply a projecting lug element designed to position the locking plate such that the bolt engaging means thereof are in suitable registration with the bolt passage 11 in the retaining element.

The bolt passage 11 preferably is designed for a size slightly larger than necessary such that while the locking plate is held automatically in applied bolt receiving position by the indexing element in the manner aforesaid, the same is capable of limited sliding movement in such applied position with the retaining lug 10 wherefor a certain amount of adjustment is permitted, if necessary, to align the bolt engaging means thereof with the bolt passage in the member secured to the supporting part. This is often found most essential in order to compensate for possible improper alignment of the bolt passages in the respective parts due to manufacturing variations and the like.

From the foregoing it will be understood that a supporting part S provided with an apertured lug retaining element struck and formed therefrom for retaining a clip type locking plate thereon in applied position, in the manner described, is admirably suited for use as the connecting means in blind locations or in any assembly in which the reverse side thereof is not readily accessible for conveniently holding the locking plate while inserting a bolt fastening thereto. Preferably, the extremity of arm 20 of the locking plate is flared to facilitate application thereof to the retaining lug element 10 and by making the distance between the arms such that they must be spread slightly apart to admit the same, it is apparent that the frictional contact exerted between the arms in clasping the lug element serves to hold the locking plate in proper bolt receiving position with the indexing element 25 received in the bolt passage 11 as shown in Fig. 4, thereby registering the bolt engaging means 22, 23, therewith and otherwise automatically locking the clip in its applied position against accidental displacement during the final assembly of the parts of an installation. Thus, the bolt fastening 30 securing member M to the supporting part S through bolt passage 31, may be readily applied to threaded engagement with the bolt engaging means 22, 23 of the locking plate by the usual securing operation entirely from the accessible side without the necessity for holding the locking plate at the reverse side thereof during such operation. In this respect, it is to be noted that inasmuch as the bolt engaging means preferably comprise yieldable tongues, the said bolt may be easily and quickly applied thereto by a simple direct axial thrust in a substantial ratchet-like action of the threads thereof with the extremities of the tongues until the same are engaged with the last effective thread on the bolt. At such point the securing bolt is given a quarter turn or more, as necessary, to fully tighten the installation and otherwise tension the locking plate such that the bolt engaging elements 22, 23, thereof are disposed in locked fastening engagement with the bolt under continuously effective spring holding action.

On tightening of the securing bolt Fig. 4, to complete the installation as shown in Fig. 5, the retaining lug element is necessarily drawn toward the adjacent face of the supporting part but cannot pull through the slot 12 therein due to the overlapping relation of portions of arm 21 which, as stated, is of a length greater than the width of said slot as best seen in Fig. 7, and is disposed entirely to the reverse side of the supporting part whereupon the member M, secured thereto may be brought into close, flush engagement with the forward side thereof. In this relation it is to be noted that the locking plate together with retaining lug element is so disposed with respect to slot 12 as to completely overlie the same as shown in Figs. 5 and 6 such that the slot is substantially concealed and effectively closed against the entrance of moisture and other foreign matter in a completed assembly.

Thus, the connecting means of the instant invention provides an installation which is superior and more advantageous in many respects than any heretofore known clinch-on nut structure embodying a conventional threaded nut which, of course, requires not only a lock washer in providing a locked assembly, but also some extraneous means such as spot welding, riveting or cage devices to retain the nut in applied position on the support preparatory to the application of the bolt fastening thereto. It will therefore be appreciated that the use of the improved connecting means disclosed herein provides a considerable saving as compared to the costs involved in the use of threaded nuts, lock washers and cage devices, materially reduces the expense and labor incident to the tedious, time-consuming assembling operations which such fastenings require, and also eliminates entirely the costly riveting or spot welding operations necessary in prior constructions for providing similar joints and connections in metallic structures.

While throughout the description the locking plate is referred to as constructed preferably of spring metal, it is to be understood as fully contemplated within the scope of this invention, that such devices be provided from any other suitable material such as cold rolled metal having sufficient resiliency and other spring-like characteristics permitting its use in the instant combination in the manner and for the purposes aforesaid.

In providing the locking plates from tempered spring steel, there is, of course, a considerable advantage over cold rolled metal in that greater strength and durability in the joint or connection is provided and an effective self-locking action of the bolt or screw fastening with the bolt engaging means thereof is obtained. A further advantage resides in the fact that the bolt engaging means provided in a spring metal locking plate are necessarily possessed of such hardness as to withstand mutilation and distortion on tightening of a threaded fastening member in locking engagement therewith; thus, in an installation comprising a spring steel locking plate, when it is desirable or necessary to dismount the assembly for repairs or replacement of a damaged part, the bolt fastening may be removed without destroying the locking plate or otherwise injuring the bolt engaging means thereof such that it may be employed again in the same or a similar installation. This, of course, is not possible in the use of cold rolled metal which is relatively soft and ductile wherefore the bolt engaging means provided therein are distorted and mutilated in the initial application and tightening of a threaded fastening member therewith. Accordingly, it is to be appreciated that the use of locking plates provided from spring metal is most desirable and of vast importance in blind locations and other assemblies in which it is impossible or impractical to replace a locking plate without tearing down a considerable portion of a completed structure in order to gain access to the retaining means holding the same onto the reverse side of the supporting part.

In certain installations, however, costs are of paramount importance as respects the application and use of such locking plates whereupon it becomes necessary to construct the same of cheaper grade material such as cold rolled steel having spring-like properties. Such material, of course, does not have the strength and desirable qualities of tempered spring steel, but is sufficiently yieldable and resilient to permit the provision of locking plates having a substantially equivalent application and use in the general combination disclosed herein. It is therefore to be understood that the invention, in no way, is limited by any reference in the description to the effect that the preferred form embodies a locking plate constructed of spring metal. It is also to be understood that the disclosure is not limited, in any manner or form, to the specific bolt engaging means shown and described, it being obvious that equivalent types of such fastening means, per se, may be embodied in numerous modifications within the spirit and scope of the invention without departing from the teachings or essential characteristics thereof.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A joint or connection comprising, in combination, a sheet metal part having an apertured lug retaining element struck and formed therefrom to project out of the plane thereof, a locking plate comprising thread engaging means retained in applied position on said sheet metal part to one side thereof by said lug element with the said thread engaging means thereof in substantial registration with the aperture in said lug element, and a member connected to said sheet metal part by a fastening having securing engagement with said thread engaging means provided on the locking plate, said locking plate having a portion overlying an edge of the opening formed in said sheet metal part by said lug retaining element struck therefrom, said portion preventing the locking plate from pulling into said opening on tightening of said fastening.

2. A joint or connection comprising, in combination, a sheet metal part having an apertured lug retaining element struck and formed therefrom to project out of the plane thereof, a locking plate provided with integral thread engaging means deformed therefrom retained in applied position on said sheet metal part to one side thereof by said lug element with the said thread engaging means thereof in substantial registration with the aperture in said lug element, and a member connected to said sheet metal part by a fastening having securing engagement with said integral thread engaging means provided on the locking plate, said locking plate having a portion overlying an edge of the opening formed in said sheet metal part by said lug retaining element struck therefrom, said portion preventing the locking plate from pulling into said opening on tightening of said fastening.

3. A joint or connection comprising, in combination, a sheet metal part having an apertured lug retaining element extending free at one end struck and formed therefrom to project out of the plane thereof, a locking plate carrying thread engaging means retained in applied position on said sheet metal part by said apertured lug element, said locking plate including substantial clip means applied to the free end of said lug element thereby engaging said lug element on its opposite faces to be retained entirely to one side of said sheet metal part with the thread engaging means thereof disposed in substantial registration with the aperture in said lug element, and a member connected to said sheet metal part in close, flush engagement with the opposite side thereof by a fastening having securing engagement with said thread engaging means carried by the locking plate, said locking plate having a portion overlying an edge of the opening formed in said sheet metal part by said lug retaining element struck therefrom, said portion preventing the locking plate from pulling into said opening on tightening of said fastening.

4. A joint or connection comprising, in combination, a sheet metal part having an apertured lug retaining element extending free at one end struck and formed therefrom to project out of the plane thereof, a one-piece, sheet metal locking plate provided with integral thread engaging means deformed therefrom retained in applied position on said sheet metal part by said apertured lug element, said locking plate including a substantial clip means applied to the free end of said lug element thereby engaging said lug element on its opposite faces to be retained in applied position entirely to one side of said sheet metal part with the thread engaging means thereof in substantial registration with the aperture in said lug element, and a member connected to said sheet metal part by a fastening passing through the aperture in said lug element and having securing engagement with said integral thread engaging means on the locking plate, said locking plate having a portion overlying an edge of the opening formed in said sheet metal part by said lug retaining element struck therefrom, said portion preventing the locking plate from pulling into said opening on tightening of said fastening.

5. A joint or connection comprising, in combination, a sheet metal part having an apertured lug retaining element struck and formed therefrom to project out of the plane thereof and presenting a slot therein serving as a bolt passage, a locking plate carrying thread engaging means retained in applied position on said sheet metal part by said apertured lug element, said locking plate including substantial clip means engaging the lug element to be retained to one side of said sheet metal part with the thread engaging means thereof disposed in substantial registration with the aperture in said lug element, and a member connected to said sheet metal part in close, flush engagement with the opposite side thereof by a fastening having securing engagement with said thread engaging means carried by the locking plate, said locking plate including an element overlapping an edge of said slot in the sheet metal part to prevent the same from pulling therethrough on tightening of said fastening.

6. A joint or connection comprising, in combination, a sheet metal part having an apertured lug retaining element struck and formed therefrom to project out of the plane thereof and presenting a slot therein serving as a bolt passage, a locking plate provided with integral bolt engaging means deformed therefrom retained in applied position on said sheet metal part by said lug element, said locking plate including substantial clip means engaging said lug element to be retained in applied position entirely to one side of said sheet metal part with the bolt engaging means thereof in substantial registration with the aperture in said lug element, and a member connected to said sheet metal part by a fastening passing through said slot therein and the aperture in said lug element to securing engagement with said integral bolt engaging means on the locking plate, said locking plate having an element overlapping an edge of said slot in the sheet metal part to prevent the same from pulling therethrough on tightening of said fastening.

7. A joint or connection comprising, in combination, a sheet metal part provided with an apertured lug retaining element struck and formed therefrom to project to one side thereof, a one-piece, sheet metal locking plate provided with bolt engaging means and comprising clip means embracing said apertured lug element to be retained in applied position on said sheet metal part entirely to one side thereof, said locking plate including indexing means engaging in the aperture in said lug element for automatically locking the same in applied position thereto with said bolt engaging means thereof in substantial registration with said aperture in the lug element, and a member connected to said sheet metal part by a fastening passing through the aperture in said lug element and having securing engagement with said integral bolt engaging means on the locking plate, said locking plate having a portion overlying an edge of the opening formed in said sheet metal part by said lug retaining element struck therefrom, said portion preventing the locking plate from pulling into said opening on tightening of said fastening.

8. A joint or connection comprising, in combination, a sheet metal part provided with an apertured lug retaining element struck and formed therefrom to project to one side thereof and presenting a slot serving as a bolt passage, a U-shaped locking plate comprising a pair of arms embracing said apertured lug element to be retained in applied position on said sheet metal part entirely to one side thereof, one arm of said locking plate comprising integral bolt engaging means deformed therefrom and the other arm including an indexing element for automatically locking the same in applied position to said lug element with said bolt engaging means thereof in substantial registration with the aperture in said lug element, and a member connected to said sheet metal part in close, flush engagement with the opposite side thereof by a fastening having securing engagement with said bolt engaging means carried by the locking plate, one of said arms of the locking plate having a portion overlapping an edge of said slot in the sheet metal part to prevent the same from pulling therethrough on tightening of said fastening.

9. A joint or connection comprising, in combination, a sheet metal part provided with an apertured lug retaining element struck and formed therefrom to project to one side thereof and presenting a slot serving as a bolt passage, a U-shaped locking plate comprising a pair of arms embracing said apertured lug element to be retained in applied position on said sheet metal part entirely to one side thereof, one of said arms comprising integral bolt engaging means deformed therefrom, the other arm of the locking plate including an indexing element engageable in the aperture in said lug element for automatically locking the same in applied position thereto with the bolt engaging means thereof in substantial registration with said aperture in the lug element, and a member connected to said sheet metal part in close, flush engagement with the opposite side thereof by a fastening passing through the slot therein and the aperture in said lug element to securing engagement with said bolt engaging means on the locking plate, one of said arms of the locking plate being of such size as to bridge said slot in the sheet metal part to prevent the same from pulling therethrough on tightening of said fastening.

10. A joint or connection comprising, in combination, a sheet metal part provided with an opening and an overlying apertured lug retaining element extending free and projecting in spaced relation to one side thereof, a locking plate comprising an arm provided with thread engaging means and adapted for bearing engagement with a face of said apertured lug element, said locking plate including substantial clip means applied to a free end of said lug element to engage the same on its opposite face and thereby retain said locking plate entirely to said one side of the sheet metal part with said thread engaging means in substantial registration with the aperture in said lug element, and a member connected to said sheet metal part in close, flush engagement with the opposite side thereof by a fastening passing through said opening therein and the aperture in the lug element to securing engagement with said thread engaging means provided on the locking plate.

11. A joint or connection comprising, in combination, a sheet metal part provided with an opening and an overlying apertured lug retaining element extending free and projecting in spaced relation to one side thereof, a one-piece, sheet metal locking plate comprising an arm provided with integral thread engaging means and adapted for bearing engagement with a face of said apertured lug element, said locking plate including substantial clip means applied to a free end of said lug element to engage the same on its opposite face and thereby retain said locking plate in applied position entirely to said one side of the sheet metal part with said integral thread engaging means in substantial registration with the aperture in said lug element, and a member connected to said sheet metal part by a fastening passing through said opening therein and the aperture in said lug element to securing engagement with said integral thread engaging means of the locking plate.

12. A joint or connection comprising, in combination, a sheet metal part provided with an opening and an overlying apertured lug retaining element extending free and projecting in spaced relation to one side thereof, a locking plate comprising an arm provided with thread engaging means and substantial clip means, said arm being adapted for bearing engagement with a face of said lug element and said clip means being applied to a free end of said apertured lug element to engage the opposite face thereof and thereby retain said locking plate in applied position entirely to said one side of said sheet metal part, said locking plate including means for automatically locking the same in applied position on said lug element with the thread engaging means thereof in substantial registration with the aperture in said lug element, and a member connected to said sheet metal part by a fastening passing through said opening therein and the aperture in the lug element to securing engagement with said thread engaging means of the locking plate.

GEORGE A. TINNERMAN.